Jan. 28, 1936.  P. NEUMANN  2,028,913
AQUARIUM
Filed May 27, 1933
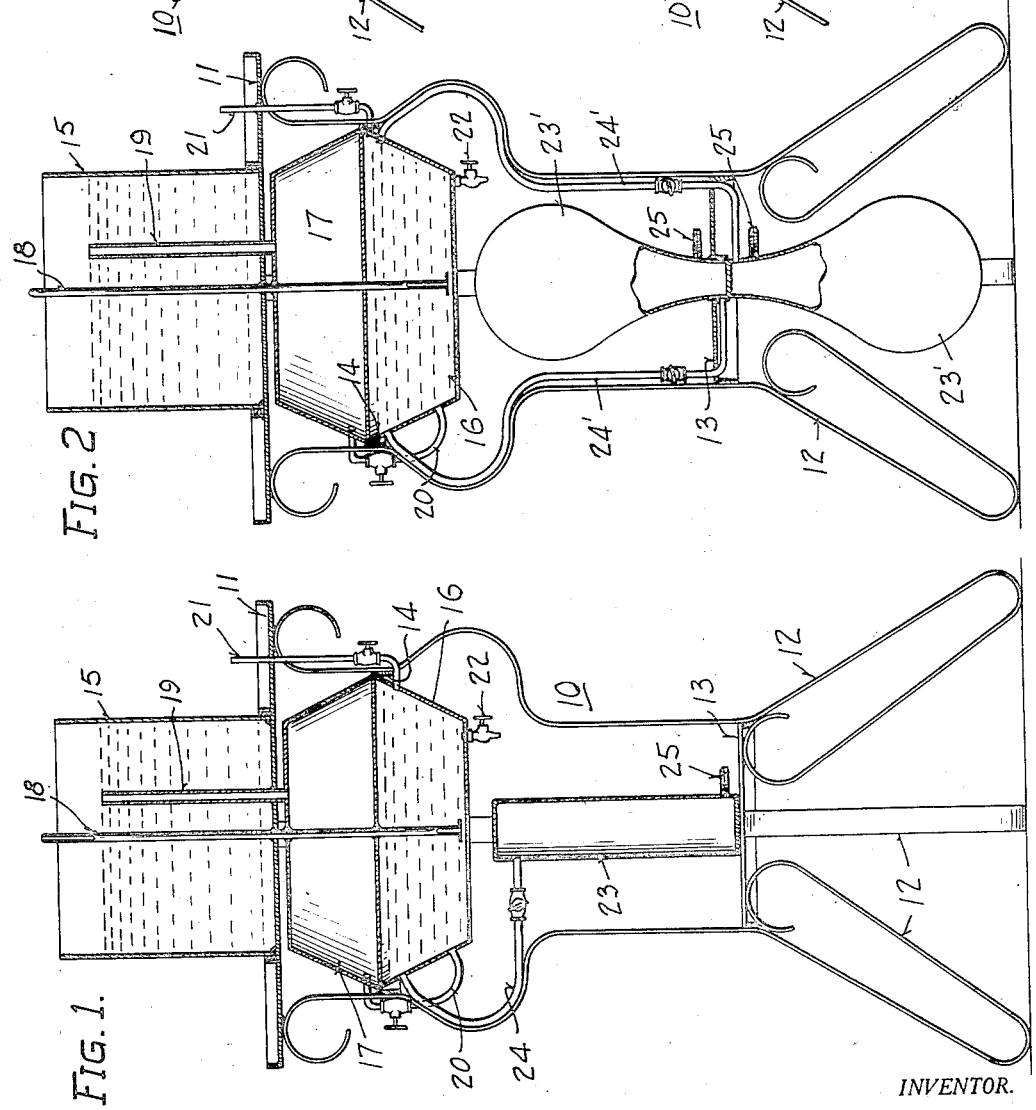
INVENTOR.
Paul Neumann
BY
Ezra W. Savage
ATTORNEY.

Patented Jan. 28, 1936

2,028,913

UNITED STATES PATENT OFFICE 2,028,913

AQUARIUM

Paul Neumann, Milwaukee, Wis.

Application May 27, 1933, Serial No. 673,134

4 Claims. (Cl. 119—5)

The invention relates generally to aquariums and more particularly to aquariums provided with means for reconditioning the water.

The object of the invention is to provide for aerating the water of an aquarium.

The invention accordingly is disclosed in the embodiment thereof shown in the accompanying drawing and comprises the features of construction, combination of elements, and arrangement of parts, which will be exemplified in the construction hereinafter set forth and the scope of the application of which will be indicated in the claims.

For a fuller understanding of the nature and objects of the invention, reference may be had to the following detailed description taken in conjunction with the accompanying drawing, in which:

Figure 1 is a view in vertical section of an aquarium constructed in accordance with the invention;

Fig. 2 is a view in vertical section of a modified form of the aquarium;

Fig. 3 is a view in vertical section of a modification of compressed air reservoirs and connecting means; and Fig. 4 is a view in vertical section taken along the line 4—4 of Fig. 3.

Referring now to the drawing, and Figs. 1 and 2 in particular, a frame or standard 10 is shown carrying a tray 11. The frame illustrated is fabricated from four legs 12 formed from sheet metal and two transverse members 13 and 14 connected to the legs in any suitable manner such as by welding or soldering. The legs may be of any suitable shape and are preferably formed with a view to giving the structure an artistic appearance.

The tray 11 seats on the upper ends of the legs and carries a water bowl 15 in which fish may be kept. The tray, in addition to carrying the water bowl, helps to brace the legs so as to make the whole structure strong and rigid. The bowl 15 will preferably be made of glass or a metal frame having glass panes so that the fish that are kept therein may easily be seen.

A water storage tank 16 and a drain receptacle 17 are disposed under the tray 11 and supported from the transverse member 14. A fountain nozzle 18 extends from the storage tank 16 through the drain receptacle 17, tray 11, and water bowl 15. This nozzle is disposed centrally of the water bowl which is large enough to catch the water that is discharged. A drain pipe 19 extends from the drain receptacle 17 to a predetermined level in the bowl 15. The height of the drain pipe 19 will control the level of the water in the bowl 15.

A valve controlled connection 20 is provided between the drain receptacle and water storage tank 16. This gives the desired communication between the receptacle and tank for the transfer of water and to facilitate the washing of them.

A valve controlled air vent 21 is provided in the water storage tank 16 to facilitate the transfer of water from the receptacle 17 to the tank 16. The tank 16 is also provided with a drain 22 so that the water may be drawn off when desired.

In order to provide pressure for discharging the water from the storage tank 16 through the fountain nozzle 18, a compressed air reservoir 23 is mounted on the transverse member 13 and connected to the storage tank 16 through a valve controlled tube 24. The reservoir 23 is provided with a valve fitting 25 similar to that provided in the inner tubes of automobile tires. This permits the storing of compressed air in the reservoir 23.

When a reservoir of this type is provided, the ordinary automobile hand operated pump may be utilized for building up sufficient pressure to operate the fountain. When an aquarium is provided with a storage reservoir of this type, it may be used in localities where there is no source of power supply such as a water system or electrical energy for operating compressors.

In the modified form illustrated in Fig. 2, two compressed air reservoirs 23' are provided. The reservoirs 23' are connected to the water storage tank 16 by separate valve controlled tubes 24'. In a structure provided with two compressed air reservoirs, when the air supply in one has become exhausted the other may be opened to continue the operation of the fountain.

In the modification shown in Figs. 3 and 4, a plurality of tanks 23" are provided. In this instance the tanks 23" are rotatably mounted and may be connected successively through a valve controlled tube 24 to the storage tank 16. A gland 26 is provided for effecting the desired connection as the tanks 23" are rotated. In this manner if reservoirs of the same capacity as 23 are employed, provision may be made for operating the fountain three or four times as long as in the structure shown in Fig. 1.

In structures that have been built, a small tin reservoir having a capacity of about one gallon holds a sufficient amount of compressed air to operate the fountain for about one hour. The aerating of the water for an hour out of twenty-four hours is usually sufficient to recondition the water to sustain the fish or other aquatic life ordinarily kept in such bowls.

All the parts of the aquarium, with the exception of the bowl 15, may be fabricated from any metal. Tin has been used because it is easy to work and inexpensive. However, copper and other more expensive metals may as readily be employed.

In the operation of the aquarium, water is poured into the bowl 15 until the drain receptacle is filled and the water level is raised to the top of the drain pipe. The air vent 21 and the valve controlled connection 20 are then opened and water permitted to flow from the drain receptacle 17 to the storage tank 16. The air vent 21 and valve controlled connection 20 are then closed.

Air is pumped into the compressed air reservoir 23 until the desired pressure is established. The pressure may be ascertained in the same manner as the pressure is measured in the ordinary automobile tire. Air is then permitted to flow through the controlled air tube 24 into the storage tank 16, developing a pressure which is sufficient to cause the water to flow upwardly through the fountain nozzle 18.

As the water falls back in the form of a spray, it is aerated. This aerating of the water restores to it the air which has been taken out by the fish.

When it is desired to wash out the receptacle 17 and storage tank 16, the air vent 21 and valve controlled connection 20 are opened and water poured down the drain pipe 19. The water used in washing is drawn off through the drain 22.

The functioning of the aquarium disclosed in Fig. 2 is the same as that disclosed in Fig. 1 with the exception that when the air supply from one reservoir is exhausted, the other is utilized. In the structure illustrated in Figs. 3 and 4, when the supply of air in one tank is exhausted, the tanks are rotated establishing communication between another tank and the storage reservoir 16.

Since certain changes may be made in the above invention and different embodiments of the invention made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, may be said to fall therebetween.

I claim:

1. An aquarium comprising in combination, a frame including a plurality of legs, a fish bowl carried by the legs, a storage tank frustro-conical in shape disposed between the legs and below the fish bowl, a fountain nozzle for discharging water from the storage tank to the bowl in the form of a spray, a compressed air reservoir disposed between the legs of the frame and connected to the water storage reservoir for building up a pressure on the water to cause it to flow through the nozzle to the bowl, a frustro-conical drain receptacle disposed between the storage tank and the bowl, the frustro-conical storage tank and drain receptacle being positioned base to base to adapt them for mounting between the legs of the frame to give an appearance of symmetry, a valve control connection between the storage tank and drain receptacle to transfer water by gravity, a standpipe connecting the bowl and drain receptacle, the standpipe serving to maintain a predetermined water level in the bowl, and means for controlling the flow of air from the compressed air reservoir to the storage tank thereby to control the delivery of water to the bowl through the fountain nozzle.

2. An aquarium comprising in combination, a frame including a plurality of legs, a fish bowl carried by the frame, a water storage tank and a drain receptacle, both frustro-conical in shape positioned base to base and disposed between the legs, the tank and receptacle being made frustro-conical in shape to give an appearance of symmetry and adapt them for mounting between the legs, a fountain nozzle for discharging water from the storage tank to the bowl in the form of a spray, a bulbous compressed air reservoir disposed between the legs and connected to the water storage reservoir for building up pressure to cause a flow of water through the nozzle to the bowl, the compressed air reservoir being shaped to adapt it for disposition between the legs, a valve controlled connection between the storage tank and drain receptacle to transfer water by gravity, a standpipe connecting the bowl and drain receptacle, the standpipe serving to maintain a predetermined water level in the bowl and means for controlling the flow of air from the compressed air reservoir to the storage tank thereby to control the delivery of water to the bowl through the fountain nozzle.

3. An aquarium comprising, in combination, a frame including a plurality of legs, the legs being evenly spaced in a circle, a fish bowl carried by the frame, a water storage tank frustro-conical in shape disposed between the legs and below the fish bowl, a fountain nozzle for discharging water from the storage tank to the bowl in the form of a spray, a compressed air reservoir disposed concentrically with the legs and connected to the water storage reservoir for building up pressure on the water to cause a flow of water through the nozzle to the bowl, a drain receptacle also frustro-conical in shape disposed between the storage tank and the bowl, the frustro-conical storage tank and drain receptacle being disposed base to base to give an appearance of symmetry and facilitate mounting between the legs, a connection between the storage tank and drain receptacle to transfer water by gravity, a standpipe connecting the bowl and drain receptacle, the standpipe serving to maintain a predetermined water level in the bowl and means for controlling the flow of air from the compressed air reservoir to the storage tank to control the delivery of water to the bowl through the fountain nozzle.

4. An aquarium comprising, in combination, a frame including a plurality of legs evenly spaced in a circle, a fish bowl carried by the legs, a water storage tank frustro-conical in shape disposed between the legs and below the fish bowl, a fountain nozzle for discharging water from the storage tank to the fish bowl, a plurality of compressed air reservoirs disposed between the legs, the reservoirs extending in different directions between the legs to give a balanced appearance, a drain receptacle similar in shape to the water storage tank also disposed between the legs, the drain receptacle and water storage tank being arranged base to base to give a symmetrical appearance, the water storage tank being disposed below the drain receptacle whereby water may be transferred by gravity, a standpipe connecting the bowl and drain receptacle, the standpipe serving to maintain a predetermined water level in the fish bowl and means for controlling the flow of air from the compressed air reservoirs to control the delivery of water to the bowl through the fountain nozzle.

PAUL NEUMANN.